Jan. 18, 1966
O. F. NILSSON
3,229,519
PLUVIOMETER
Filed May 14, 1962
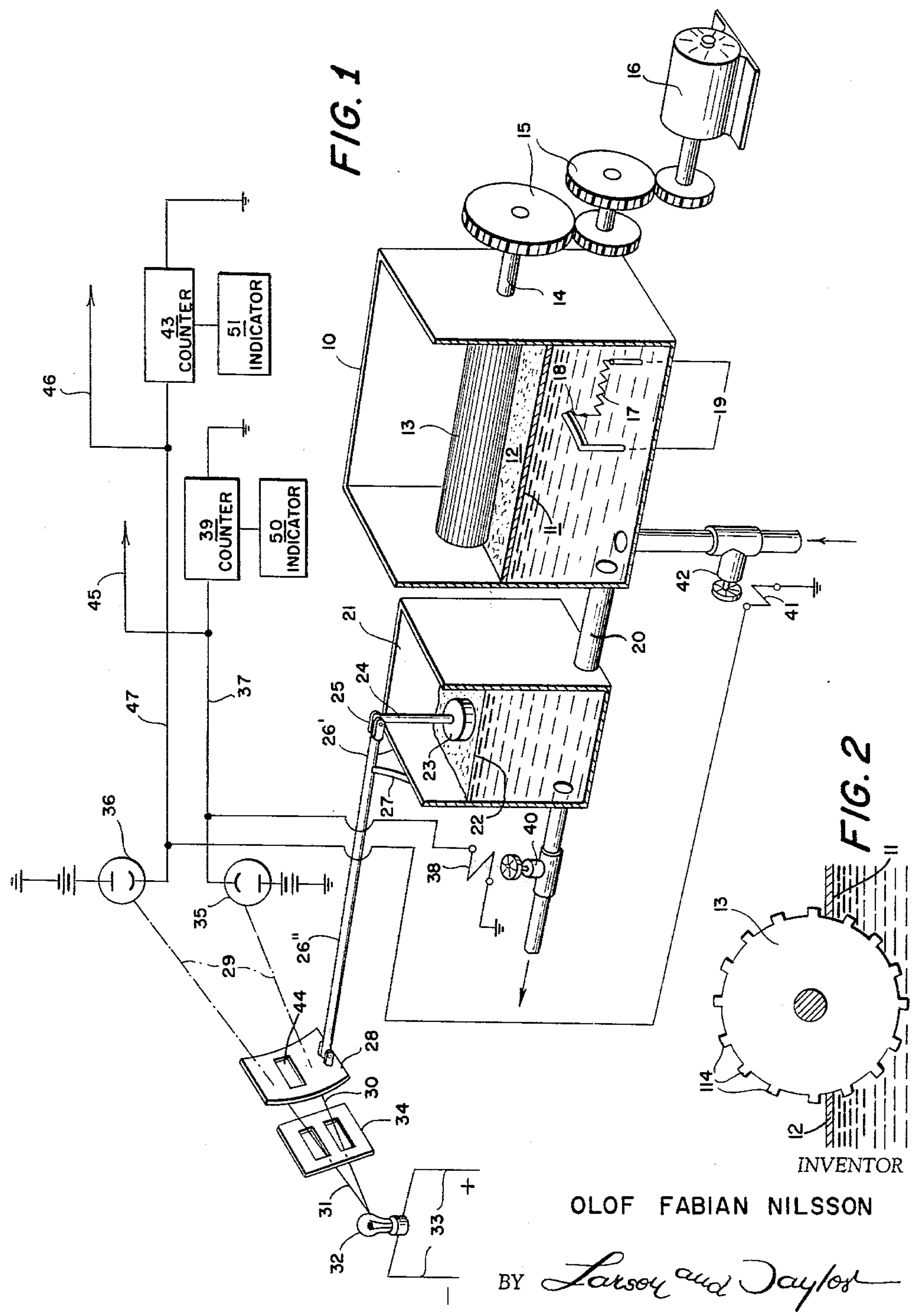
INVENTOR
OLOF FABIAN NILSSON
BY Larson and Taylor
ATTORNEYS United States Patent Office 3,229,519 Patented Jan. 18, 1966

3,229,519

PLUVIOMETER

Olof Fabian Nilsson, Kronobergsgatan 11, Stockholm, Sweden

Filed May 14, 1962, Ser. No. 194,636
Claims priority, application Sweden, June 20, 1961, 6,409/61
4 Claims. (Cl. 73—171)

The two most important, basic observations concerning precipitation measurements are the amount and intensity of the precipitation. The older, manual method for measuring the precipitation, for instance once a day in a measuring glass, is today too indefinite, because it does not give the data which science and commerce demand. This prior art method gives a statement about the total amount of precipitation during a given rather lengthy period of time but it does not give any statement about its intensity or about the time when the precipitation falls. A slowly falling rain is of great importance for the vegetation whereas the same amount of precipitation in the form of a torrent of rain may cause great damages. On the other hand, such torrents of rain often will be practically entirely and immediately delivered to the water reservoirs.

When planning drainage networks, roads, bridges, harbors, aerodromes and so on, regard must be taken not only of the amount of precipitation and the place in question but also of its maximum intensity.

These factors could be revealed, if at all, only imperfectly by the known pluviometers.

It is true that self-recording precipitation meters have, by their statements about the time of the amount of precipitation, given valuable documentation in traffic casualties, insurance control and so on. Engineers and scientists have been able to pursue their work and make valuable calculations for this work with the support of these diagrams. Such self-recording precipitation meters have, however, hitherto been so complicated and expensive and have required such intensive control, that they could not be used to a large extent for practical reasons. In order that self-recording pluviometers can be made suitable for weather observations which have to take place in a great number of places, which usually cannot be supervised by a skilled personnel, it is necessary to have quick and effective remote control of the measuring values taking place and to have pluviometers that work fully automatically without supervision. Many different problems exist because of these requirements, for instance the problem, when the precipitation consists of snow, of preventing snow collected in the pulviometer vessel from being blown away and, when the precipitation takes place at a high temperature, to compensate for the evaporation which may take place.

An additional problem is found in providing reading means which intermittently indicate with a sufficiently quick response the precipitation which has been collected in the pulviometer vessel.

The present invention comprises a pulviometer with a vessel which is open upwardly for collecting the precipitation, combined with reading means for the amount of precipitation collected in said vessel.

According to the invention there is provided in the vessel a slowly rotating horizontal cylinder which is arranged partly below the normal level of the collected precipitation, partly above the normal level, said cylinder being provided with an unevennesses on its surface for attracting a thin layer of oil, said layer covering the surface of the precipitation collected in the vessel.

According to a further development of this invention, a heating element is arranged in the vessel so that the snow which may be collected in the vessel will be melted to make the measurement easier, said heating element being controlled by a thermostat.

In a pulviometer of the above mentioned kind it is possible to connect the pulviometer vessel to a smaller float vessel, so that the two vessels communicate mutually. The float existing in the last mentioned vessel should be provided with a gearing arrangement to indicate how much it is lifted by the level of precipitation existing in the float vessel.

In this arrangement it is preferable to control the level of the precipitation in the float vessel automatically in such a way that, each time the precipitation level in the float vessel has risen above a predetermined upper limit, a given quantity of the collected precipitation in the float vessel and thereby also in the pulviometer vessel is tapped off and the time for each such tapping off of a constant amount of precipitation is recorded.

To avoid the possibility that the level during dry and hot weather sinks beneath the normal level in the pulviometer vessel and in the float vessel, a control device may be made for adding given, predetermined quantities of water to said vessels, and a recordation of the times each such added quantity of water takes place, whereby the registered result can be used as a measure of the evaporation.

For the above mentioned purpose, specific means may be provided, by which the reading of the level in the float vessel takes place and the feed or tapping off of water to or from, respectively, the float vessel be made.

As the float vessel and the pluviometer vessel communicate, it is of course immaterial if the tapping off of water or the adding of water takes place directly from or to the float vessel, respectively, or if it takes place to or from the pulviometer vessel, respectively, and through communication between these two vessels is transferred into a change in level in the pluviometer vessel.

The invention will be further described below with reference to the attached drawing, wherein FIGURE 1 is a partly schematic representation of the invention, and FIGURE 2 is an end view of an element thereof.

In the drawing, 10 indicates a pluviometer vessel. This vessel is open at its upper part but closed at the sides and in the bottom. Normal water level is indicated by 11, and above this water there floats a layer of oil 12 which has a very low rate of evaporation. In the water and the oil, respectively, a cylinder 13 floats with less than half of its circumference immersed. The cylinder is connected by means of a shaft 14 to a gear train 15, driven from a motor 16 with a rather low number of turns, for instance one turn every 30 seconds.

The cylinder 13 is provided with unevennesses of such a kind that will cause the oil to cling to the cylinder as it passes through the oil layer. The unevennesses may, for instance, have the form of strips 114, running in the direction of the axis of the cylinder. The oil should be of a type that has a low degree of evaporation and also a high surface tension, so that it will form a continuous layer on the cylinder 13 and the strips 114.

The oil has a twofold purpose. Firstly the oil should cover existing water in the pluviometer vessel 10 so that the lowest possible degree of evaporation of this water will take place; secondly, the oil should also retain any percipitation, independent of whether it is rain or snow. However, it may happen that very small drops of water in the case of a very fine rain or fog or mist remains floating on the upper surface of the oil film, and, due to their content of air, snow flakes may also be so light, that they cannot sink into the water but remain floating on the oil film. This especially, may happen, if the oil film has a very high surface tension. The rotating cylinder 13 functions to catch up such lighter and/or smaller particles of the precipitation by its rough surface. Performed tests have proved that when snowflakes fall onto the surface of the pluviometer vessel 10, they will stick to the oil layer and be carried by the rotating cylinder 13. When the cylinder rotates, they will rather quickly be dipped down through the oil film into the water and combine with the water. There will, therefore, be little risk that the snow precipitation, as often happens with conventional meters, will be blown out of the meter. A falling rain-drop is immediately surrounded by oil from the cylinder, preventing evaporation from the rain-drop. When, during the rotation of the cylinder 13, the raindrop with its skin of oil gets down into the fluid the oil will remain in the oil layer 12, while the content, i.e., the rain-drop, will combine with the water below the surface 11.

It is important that the fluid in the pluviometer should not freeze and it is also important that, if the precipitation consists of snow, this be melted immediately. For this purpose there is an electrical resistor 17 in the bottom of the pluviometer vessel, controlled by a thermostatically acting contact 18, for instance a bi-metallic contact. The heating arrangement 17, 18 is fed from an available electrical supply network 19. The arrangement is so set that an above freezing temperature will be maintained in the water of the pluviometer vessel, said temperature being sufficiently high in order that snow or hail falling into the vessel will melt to water practically immediately but not being so high that substantial evaporation takes place.

By means of a pipe line 20 the pluviometer vessel 10 communicates with the float vessel 21. The float vessel 21 is preferably not provided with an oil film, but may be if desired. If the float vessel 21 is not provided with an oil film, the water level in this vessel will, due to the difference in specific weight between the water and the oil, be somewhere between the upper level 11 of the water in the pluviometer vessel and the upper level 12 of the oil therein.

In the float vessel, a float 23 is provided and is connected by means of a bar 24 and a joint 25 to a two-armed lever 26, which is pivotable in a vertical plane around the joint 27. The lever 26 is divided into one short arm 26′, situated between the two joints 25 and 27, and a very long arm 26″, so that a high relative movement is obtained. The arm 26″ has on its free end a plate 28, normally moving within a limited range 29 between two rays of light 30 and 31. The rays of light 30 and 31, respectively, may preferably be fed from one and the same source of light 32 which may consist of an electrical lamp, fed by means of the conductors 33. Preferably there is also an optical means present, not shown in the drawing, in combination with a diaphragm 34 with two openings. The two rays of light from the light source 32 should normally be blocked by the plate 28. If, however, the plate should be displaced due to the fluid level 22 in the float vessel being lifted or lowered, one or the other of the two rays of light 30, 31 will hit a photo cell 35 or 36, respectively.

The light ray 30 and the photo cell 35 are situated in such a way that, when the plate is displaced into a position in which the ray of light 30 is not blocked, an indication will be obtained showing that the fluid level 22 in the float vessel has been lifted. Thereby the photo cell 35 is illuminated and will give off an electrical pulse which is carried by a conduit 37 to a relay 38 as well as to a counter 39. The counter 39 has an indicating device 50 which provides a reading of the total amount of water taken from the vessels. This device may of course be calibrated to provide sub-totals for a given period of time or other such data. The relay 38 operates a quantum valve 40. This valve is provided to cause an immediate tapping off of fluid from the vessels 10 and 21, the amount of fluid being completely predetermined. Performed tests have proved that the quantity of tapped off water may be so low that it results in .05 millimeter deviation in the water level from the level position 22, which is the normal position of said arrangement. Through the tapping off of this quantity of collected precipitation the float is again displaced, and via the lever 26′–26″ the plate 28 is also displaced so that the ray of light 30 is again blocked. When, through further precipitation, the fluid level 22 has been lifted sufficiently, a momentary illumination of the photo cell 35 will take place again and a pulse will again be conducted to the relay 38 and the counter 39. The relay again taps off the same small quantity of the collected precipitation via the valve 40. In this way the number of such tapped off quantities can easily be registered in the counter which will thereby give a summed statement about the magnitude of the precipitation. By combining the counter with a recording apparatus in which a time recordation is also introduced, there will be obtained a very frequently repeated intermittent recordation of the precipitation from which can be read the intensity of the precipitation at any specific time and also the total amount of the precipitation.

It will be evident from the above that it is very important for the perfect functioning of the pluviometer according to the present invention that the fluid level 22 is kept constant, not only when there is a precipitation but primarily during the intervals of time when there is no precipitation, but instead, evaporation will take place. As a matter of fact, if there should be evaporation during a lengthy period of time, the fluid level 22 may sink so much that a rather substantial portion of the added precipitation would not be registered at all, because the fluid level 22 would not yet have reached the position in which registration starts. To prevent the fluid level 22 from being lowered in this way, we have employed an arrangement utilizing the ray of light 31 and the photo cell 36. These are combined with a relay 41, which functions like the relay 38 and which will thus control a quantum valve 42, to allow a predetermined amount of water to enter the vessel. Each time the fluid level 22 has dropped a predetermined amount, which may for instance be .05 millimeter, the ray of light 30 will still be blocked by the plate 28 but the ray of light 31 will momentarily not be blocked. A pulse is thereby emitted from the photo cell 36, and conducted to a counter 43 as well as to the relay 41. The counter 43 has an indicating device 51 similar to 50 on counter 39, which provides a reading of the total amount of water added to the vessels. This device may, of course, be calibrated to provide sub-totals for certain periods of time or other similar information. The relay 41 opens the valve 42 to let a given quantity of water into the bottom of the pluviometer vessel 10, whereby its water level as well as the water level 22 in the float vessel 21 is again lifted. Due to this the float will move upwardly a small distance which is sufficient for the plate 28 to block the ray of light 31 once more.

The plate 28 is provided with a slot 44, which will alternatively open the path of the ray of light 30 to the photo cell 35 for marking a given quantity of precipitation and resetting the fluid level 22, or the path of the ray of light 31 for marking a given quantity of evaporation and also for resetting the fluid level 22.

The counter 39 will, as explained above, indicate the precipitation and the counter 43 will in a corresponding manner indicate the evaporation.

It is obvious that the counters, which have only been shown schematically in the drawing, may be made time registering, so that the time for the different pulses which are given off from the photo cells 35 and 36 can be read or recorded. It is also obvious that these counters need not necessarily be arranged adjacent to the pluviometer, but that branches 45 and 46, respectively, may be taken off from the conduits 37, 47 to a radio transmitter or other remote transfer arrangement, so that there can be read at a distance from the pluviometer the different markings in the counters 39 and 43.

Of course, the invention is not limited to the arrangement, described in detail above and shown in the drawing but different modifications of the invention may be made within the spirit of the claims.

What is claimed is:

1. A pluviometer comprising an upwardly open vessel for collecting precipitation and having liquid therein, means connected with said vessel for sensing the volume of liquid therein, a generally horizontal body in said vessel partially immersed in said liquid, means for rotating said body on a substantially horizontal axis, whereby to convey precipitation falling into said vessel into the body of liquid therein and to a level below the surface thereof, said liquid comprising water and an oil layer on said water characterized by a low degree of evaporation and a high surface tension.

2. A pluviometer as set forth in claim 1, said body being a cylinder.

3. A pluviometer as set forth in claim 1, said body having an irregular surface.

4. A pluviometer as set forth in claim 1, said body being generally cylindrical and having axially extending ribs thereon.

References Cited by the Examiner

UNITED STATES PATENTS

| | | | |
|---|---|---|---|
| 2,468,692 | 4/1949 | Stevens | 73—171 |
| 2,497,759 | 2/1950 | Cappleman | 73—171 |
| 2,503,091 | 4/1950 | Brooke et al. | 73—432 |
| 2,701,472 | 2/1955 | Allen et al. | 73—171 |
| 2,789,431 | 4/1957 | Wong | 73—171 |
| 2,964,943 | 12/1960 | Anderson | 73—171 |
| 3,054,290 | 9/1962 | Smith | 73—171 |

RICHARD C. QUEISSER, *Primary Examiner.*

ROBERT EVANS, *Examiner.*